United States Patent [19]
Cooper et al.

[11] 3,826,288
[45] July 30, 1974

[54] SELF-RECOILING HOSE

[75] Inventors: Jerry W. Cooper, Waynesville; John S. Haley, Lake Junaluska, both of N.C.

[73] Assignee: Dayco Corporation, Dayton, Ohio

[22] Filed: Apr. 20, 1973

[21] Appl. No.: 353,054

[52] U.S. Cl.............................. 138/178, 138/118
[51] Int. Cl........................... F16l 9/12, F16l 11/04
[58] Field of Search.................... 138/118, 119, 109

[56] References Cited
UNITED STATES PATENTS

| | | | |
|---|---|---|---|
| 2,814,529 | 11/1957 | Arnt............................... | 138/178 X |
| 3,021,871 | 2/1962 | Rodgers............................... | 138/118 |
| 3,288,169 | 11/1966 | Moss................................... | 138/118 |
| 3,402,743 | 9/1968 | Brueder........................... | 138/118 X |

*Primary Examiner*—Richard C. Queisser
*Assistant Examiner*—Daniel M. Yasich

[57] ABSTRACT

A self-recoiling hose having a plurality of integral convolutions wherein said convolutions with the hose in a coiled condition are arranged in a corresponding plurality of parallel planes and each convolution has a peripheral outline which is substantially noncircular.

9 Claims, 5 Drawing Figures

PATENTED JUL 30 1974   3,826,288

SELF-RECOILING HOSE

BACKGROUND OF THE INVENTION

There are numerous applications in industry for a tube or hose which is used to convey a fluid such as compressed air, for example, to a device or apparatus which is operated by such fluid and which may be of the hand portable variety and routinely used at a plurality of different positions located different distances remote from a source of such fluid. Therefore, it is desirable to have such a device supplied by a coiled tube or hose which may be extended to an infinite number of lengths yet is self-recoiling so that it occupies a comparatively small volume when not in use.

Self-recoiling hose and the like have been proposed heretofore; however, such previously proposed self-recoiling hose are generally deficient because some of such hose require additional mechanical devices to keep them in a coiled condition, others of such hose can only be extended comparatively small distances, others have distorted or badly flattened cross-sectional areas caused during the process of making such hose self-recoiling and still others of such hose occupy excessive volumes in their coiled conditions.

SUMMARY

This invention provides a self-recoiling hose made of a nonmetallic material which overcomes the above-mentioned deficiencies and is comprised of a plurality of integral convolutions wherein each of the convolutions with the hose in a coiled condition is arranged roughly in a plane which is approximately parallel to associated planes of adjacent convolutions and each convolution has a peripheral outline which is substantially noncircular.

Other details, uses, and advantages of this invention will be readily apparent from the embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 1:
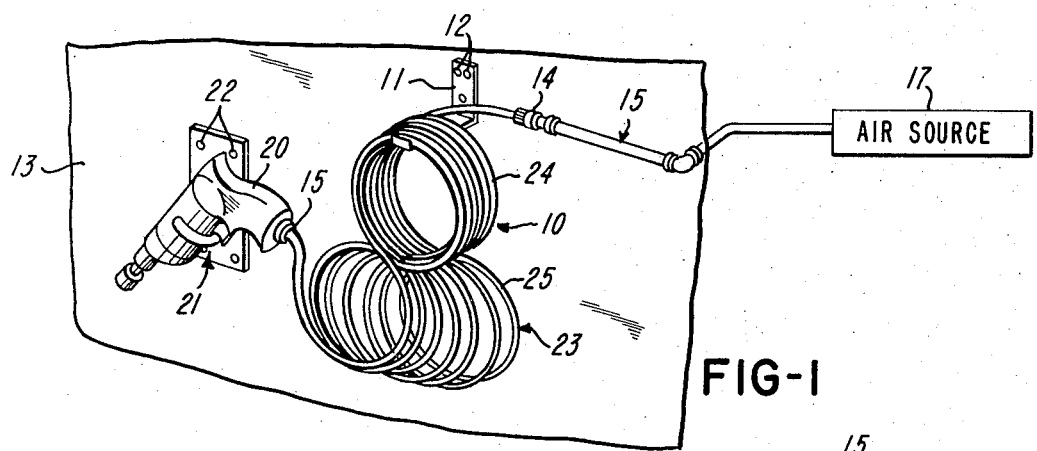
FIG. 1 is a perspective view illustrating one exemplary embodiment of a self-recoiling hose of this invention in a coiled condition and being supported on an associated bracket with opposite ends thereof connected to a source of fluid and to a device which utilizes such fluid respectively.

Reference is now made to FIG. 1 of the drawing which illustrates one exemplary embodiment of a self-recoiling hose which is designated generally by the reference numeral 10 and such hose is made of a nonmetallic material. The hose 10 is particularly adapted to be hung on an associated bracket 11 which is suitably fixed by fasteners 12 to a support which is shown in the form of a vertical planar wall 13.

Figure 2:
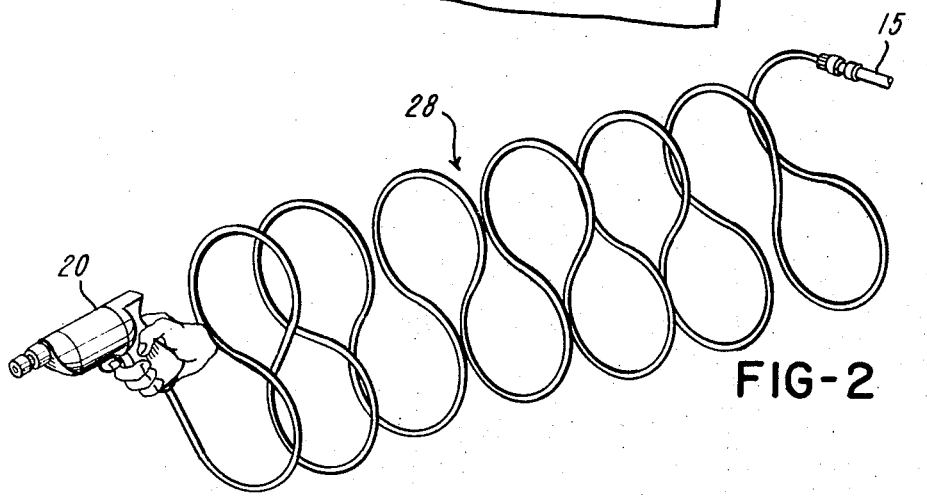
FIG. 2 is a perspective view illustrating the hose of FIG. 1 in a partially extended condition.

The hose 10 has a plurality of unique integral convolutions defining such hose whereby for a given maximum length of hose the hose 10 in its coiled condition occupies a minimum volume. Further, the hose 10 may be extended or expanded without tangling essentially as illustrated in FIG. 2 and is substantially self-recoiling so that once the terminal outer end thereof is returned from its extended position of FIG. 2 to a location adjacent its bracket 11 on the supporting wall 13 the hose 10 returns to its original coiled configuration illustrated in FIG. 1.

The hose 10 may be used to convey any suitable fluid and is provided with a pair of connectors 14 and 15 at opposite ends thereof and such connectors are suitably fastened in position in a fluid-tight manner. The connector 14 is used to connect the inlet end of the hose 10 to a rigid tube assembly 15 which in this example is, in turn, suitably connected to a source of air under regulated pressure and such source is shown schematically by a rectangular block and given the reference numeral 17. The air source 17 may be in the form of a pressurized container, an air compressor, a source of shop air, or the like.

The connector 15 may be used to connect the opposite end of the hose 10 to any device or apparatus to which it is desired to supply a fluid. In this example air under pressure is supplied to a reversible hand-portable air wrench 20 of known construction and of the type normally used to remove threaded nuts used to fasten a wheel of an automobile to an associated supporting hub. When not in use the device 20 is supported on an associated supporting bracket 21 which is suitably fixed in position against the vertical wall 13 by a plurality of fasteners 22.

The hose 10, as previously mentioned, is comprised of a plurality of integral convolutions each of which is designated generally by the reference numeral 23. Each of the convolutions 23 with the hose in a coiled condition is arranged roughly in a plane which is approximately parallel to associated planes of adjacent convolutions; and, in this example it will be seen from FIG. 1 that each convolution 23 is arranged in a plane which is approximately parallel to the vertical plane of the planar wall 13.

Each convolution 23 in its coiled condition has at least a pair of coils 24 and 25 which have the appearance of being tangent when viewed normal to their associated plane. In particular, when viewing the coils 24 and 25 of each convolution 23 substantially perpendicularly toward the vertical wall 13 it will be seen that such coils have the appearance of being tangent.

Each of the pair of coils 24 and 25 in each convolution 23 of the hose 10 are subsantially circular whereby it will be apparent from FIG. 1 that each convolution 23 has a substantially figure 8 configuration. This figure 8 configuration assures that for a given comparatively large length of hose the overall volume occupied by such hose is comparatively small. The figure 8 configuration lends itself to expanding or extending the hose 10 as illustrated at 28 in FIG. 2 so that the device 20 may be used at a location remote from the rigid tube assembly 15 and once the device 20 is returned to its bracket 21 the hose 10 recoils itself into the configuration illustrated in FIG. 1 in a nontangling manner whereby its coils 24 may be simple hooked over the bracket 11.

The hose 10 is preferably made of a thermoplastic material which has a so-called "plastic memory" or "elastic memory." It has been found that nylon has exceptional elastic memory and has been used successfully in making the hose of this invention.

Figure 3:
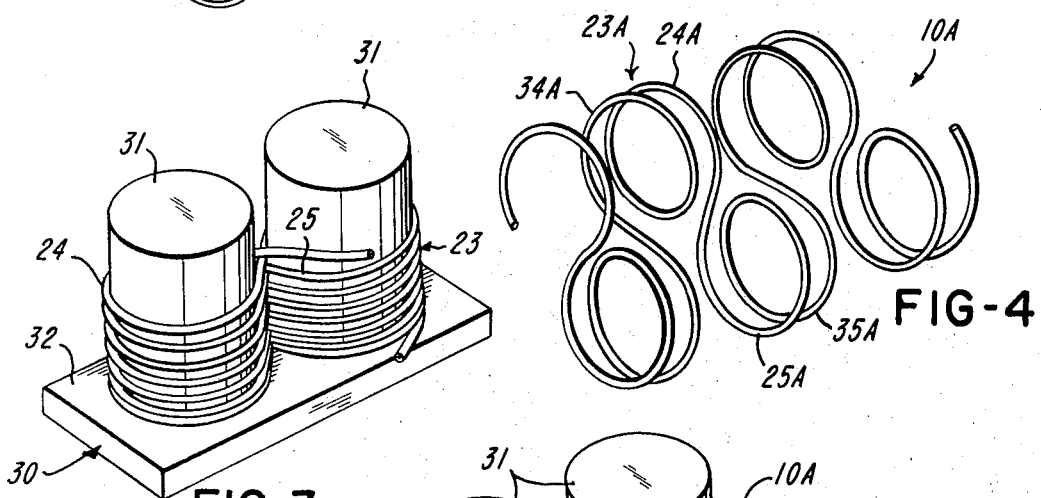
FIG. 3 is a perspective view particularly illustrating a typical fixture and method which may be used to make the hose of FIG. 1.

Any suitable apparatus and method may be used to make the hose 10 with the figure 8 configuration illustrated in FIG. 1. For example, a fixture which is designated generally by the reference numeral 30 in FIG. 3 may be used and the fixture 30 has a pair of right circular cylindrical mandrels 31 suitably fixed to a base plate 32 thereof. A straight length of suitable tubing or hose stock such as nylon may then be coiled first around one of the mandrels 31 and then around the other mandrel 31 in the substantially figure 8 configuration illustrated to define the plurality of substantially parallel convolutions 23 each having a pair of coils 24 and 25. The fixture 30 with the hose thus coiled thereon may then be suitably heated to a controlled predetermined temperature whereby the thus coiled hose assumes the figure 8 configuration free of internal stresses. The coiled hose is then suitably cooled and removed from the fixture whereupon the character of the hose material is such that the formed hose 10 due to its elastic memory retains the figure 8 configuration in each of its convolutions 23.

Any technique and apparatus known in the art may be used to heat and cool the hose which is coiled on the fixture 20. For example, the hose may be heated in an oven, tunnel, or by passing a heated fluid therethrough. Similarly, the hose may be cooled in a cooled environment or by passing a cool fluid therethrough.

Figure 4:
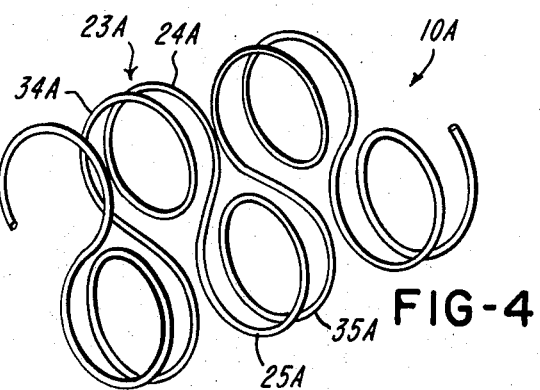
FIG. 4 is a perspective view of the central portion of another exemplary embodiment of a self-recoiling hose with such hose in a partially extended condition similar to the extended condition of the hose illustrated in FIG. 2.

Another exemplary embodiment of the hose of this invention is illustrated in FIG. 4 of the drawing. The hose illustrated in FIG. 4 is very similar to the hose 10; therefore, such hose will be designated generally by the reference numeral 10A and parts of the hose 10A which are similar to corresponding parts of the hose 10 will be designated in the drawing by the same reference numerals as in the hose 10 followed by the letter designation A. Only those component parts of the hose 10A which are different from corresponding parts of the hose 10 will be designated by a new reference numeral also followed by the associated letter designation A and described in detail.

The self-recoiling hose 10A is also preferably made of a nonmetallic material in the form of a thermoplastic material and has a plurality of integral convolutions 23A. Each of the convolutions 23A with the hose in a coiled condition is arranged roughly in a plane which is approximately parallel to associated planes of adjacent convolutions and each convolution 23A has at least a pair of coils 24A and 25A which have the appearance of being tangent when viewed normal to their associated plane.

Each coil 24A and 25A of each convolution 23A comprising the hose 10A has another coil joining each of the pair of coils 24A and 25A. In particular, it will be seen in FIG. 4 that in each convolution 23A the coil 24A is adjoined by a coil 34A while the coil 25A is adjoined by a coil 35A. Each of the coils 34A and 35A is approximately equal in size to its associated coil 24A and 25A respectively with the hose 10A in a coiled condition, see FIG. 5, and each coil 34A is arranged substantially flatly against its associated coil 24A and each coil 35A is arranged substantially flatly against its associated coil 25A.

Figure 5:
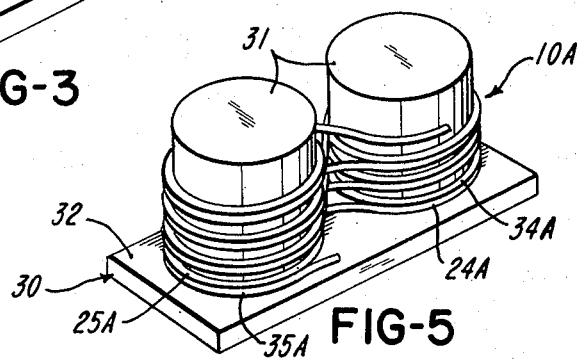
FIG. 5 is a perspective view illustrating the fixture of FIG. 3 being used to make the hose of FIG. 4.

As in the case of the hose 10 the hose 10A is preferably made of a suitable thermoplastic material having elastic memory, such as nylon or the like. Further, as shown in FIG. 5, the hose 10A may be made on the fixture 30 which has the base plate 32 and the pair of right circular cylindrical mandrels 31 fixed to such base plate.

In making the self-recoiling hose 10A a straight section of tubing or hose is suitably wrapped in position around the fixture 30 whereupon the wrapped hose is first heated and then cooled in the manner described in connection with the hose 10 to define the completed hose 10A. The coiling of hose stock around fixture 30 is achieved by first coiling a coil 35A around one mandrel 31 followed by a coil 25A, then coiling a coil 24A around the other mandrel 31 followed by coiling a coil 34A around such other mandrel and alternating between mandrels 31 until the desired length of hose stock has been coiled in positions to define the desired length of self-recoiling hose 10A.

The hose 10A may be utilized in any application where the hose 10 would be normally employed as well as other applications; and, the hose 10A may be provided with suitable fittings at opposite ends thereof which may be similar to the fittings 14 and 15 so that hose 10A may be connected to a source of fluid at one end and a device such as the device 20 at its opposite end.

In this disclosure each hose 10 and 10A has been described as comprising a plurality of integral convolutions of noncircular configuration and each convolution illustrated in the drawing with the hose in a coiled condition is arranged roughly in a plane which is approximately parallel to the roughly parallel planes of associated adjacent convolutions. Further, each convolution has at least a pair of coils which have the appearance of being tangent when viewed normal to their associated plane. However, it will be appreciated that this language encompasses defining each convolution so that it may have not only two coils but substantially more than two coils and such coils may be in pattern where the centers of such coils may be in a substantially straight line or such centers may be in any geometric pattern. For example, the centers may be arranged in a rectangular pattern whereby the coils would have the appearance of a clover leaf.

In any event, regardless of the detailed configuration of each convolution, it will be appreciated that such convolution is noncircular and thus assures the provision of a maximum length of self-recoiling hose in a minimum volume.

The above description refers to the utilization of a thermoplastic material, such a nylon, for forming each hose 10 and 10A. However, it must be emphasized that any suitable material may be used for this purpose and elastomeric materials such as polyethylene and specially compounded natural and synthetic rubber compounds may be employed to define the hose of this invention.

While present exemplary embodiments of this invention, and methods of practicing the same, have been illustrated and described, it will be recognized that this invention may be otherwise variously embodied and practiced within the scope of the following claims.

What is claimed is:

1. A self-recoiling elastomeric hose comprising a plurality of integral convolutions, each of said convolutions with said hose in a coiled unextended condition being arranged roughly in a plane which is approximately parallel to associated planes of adjacent convolutions and each convolution having roughly a figure eight configuration defined by a pair of coils which have the appearance of being tangent when viewed normal to their associated plane said hose having a tendency to maintain said configuration.

2. A hose as set forth in claim 1 made of a thermoplastic material.

3. A hose as set forth in claim 2 in which said thermoplastic material is nylon.

4. A hose as set forth in claim 1 in which said figure eight configuration of each convolution is defined by a pair of cooperating coils which are substantially circular.

5. A hose as set forth in claim 4 and further comprising another coil adjoining at least one of said pair of cooperating coils, said other coil being approximately equal in size to its associated coil and being arranged substantially flatly thereagainst with said hose in a coiled condition.

6. A hose as set forth in claim 4 and further comprising another coil adjoining each of said pair of cooperating coils, each of said other coils being approximately equal in size to its associated coil and being arranged substantially flatly thereagainst with said hose in a coiled condition.

7. A hose as set forth in claim 4 and further comprising a pair of fittings at opposed ends thereof with one of said fittings being adapted to attach said hose to a source of fluid.

8. A hose as set forth in claim 4 made of a thermoplastic material having an elastic memory and being particularly adapted to convey a fluid under pressure.

9. A hose as set forth in claim 8 wherein said thermoplastic material is nylon and said fluid is air.

* * * * *